(12) United States Patent
Li et al.

(10) Patent No.: US 7,619,835 B2
(45) Date of Patent: Nov. 17, 2009

(54) IMAGE-FORMING LENS SET

(75) Inventors: Hung-Chih Li, Taichung (TW);
Shih-Han Chen, Taipei County (TW)

(73) Assignee: Genius Electronic Optical Co., Ltd.,
Taichung (TW)

( * ) Notice: Subject to any disclaimer, the term of this patent is extended or adjusted under 35 U.S.C. 154(b) by 92 days.

(21) Appl. No.: 11/750,605

(22) Filed: May 18, 2007

(65) Prior Publication Data

US 2008/0165434 A1    Jul. 10, 2008

(51) Int. Cl.
*G02B 9/14* (2006.01)
*G02B 13/18* (2006.01)
*G02B 3/02* (2006.01)

(52) U.S. Cl. ........................... 359/785; 359/716
(58) Field of Classification Search ............ 359/785, 359/790, 716, 690
See application file for complete search history.

(56) References Cited

U.S. PATENT DOCUMENTS 4,139,266 A * 2/1979 Koizumi .................. 359/790
5,973,850 A * 10/1999 Nagaoka .................. 359/785
6,466,377 B1 * 10/2002 Saito et al. ............... 359/785

* cited by examiner

*Primary Examiner*—Alicia M Harrington
(74) *Attorney, Agent, or Firm*—Browdy and Neimark, PLLC

(57) ABSTRACT

An image-forming lens set includes a first lens with positive power, a second lens with negative power, an aperture stop, and a third lens with positive power, which are arranged from an object side in order. The first lens has a concave surface facing the object side and a convex surface facing the image side, and at least one of the two surfaces is a non-spherical surface. The second lens is a convex-concave lens having two non-spherical opposite surfaces including a concave surface facing the image side. The third lens has two non-spherical opposite convex surfaces. At least one of the first, second and third lenses is coated with a layer of optical film for filtering light. By means of the lenses having non-spherical surfaces, the image-forming lens set has a simple structure. By means of the optical film, the image formed in a better quality can achieve.

6 Claims, 1 Drawing Sheet

IMAGE-FORMING LENS SET

BACKGROUND OF THE INVENTION

1. Field of the Invention

The present invention relates generally to image-forming lenses and more particularly, to an image-forming lens set having a plurality of lenses.

2. Description of the Related Art

Following fast development of multimedia technology, image-forming lenses have been intensively used in a variety of mobile electronic products such as digital camera, mobile camera telephone, personal digital assistant (PDA), and etc., for picking up images.

Further, to satisfy the requirements of high-tech product users for better convenience, quality and utility, high-tech products must be small-sized while maintaining the quality and lowering the cost. Image-forming lens sets encounter the same market challenge, i.e., image-forming lens sets must have a simple structure design to lower the cost and reduce the aberrations so as to improve the quality and reduce the size, satisfying the requirement for better product utility.

SUMMARY OF THE INVENTION

The present invention has been accomplished under the circumstances in view. It is the main objective of the present invention to provide a simple structure of image-forming lens set that is easy and inexpensive to manufacture and that provides a high image quality.

To achieve this objective of the present invention, the image-forming lens set comprises a first lens with positive power, a second lens with negative power, an aperture stop, and a third lens with positive power, which are arranged along an optical axis from an object side toward an image side in order. The first lens has two opposite surfaces including a concave surface facing the object side and a convex surface facing the image side, and at least one of the two opposite surfaces is a non-spherical surface. The second lens is a convex-concave lens having two non-spherical opposite surfaces including a concave surface facing the image side. The third lens has two non-spherical opposite convex surfaces facing the object side and image side respectively. At least one of the first, second and third lenses is coated with a layer of optical film for filtering light. By means of the lenses having non-spherical surfaces, the image-forming lens set has a simple structure. By means of the optical film, the image formed in a better quality can achieve.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which is given by way of illustration only, and thus is not limitative of the present invention, and wherein.

DETAILED DESCRIPTION OF THE INVENTION

Figure 1:
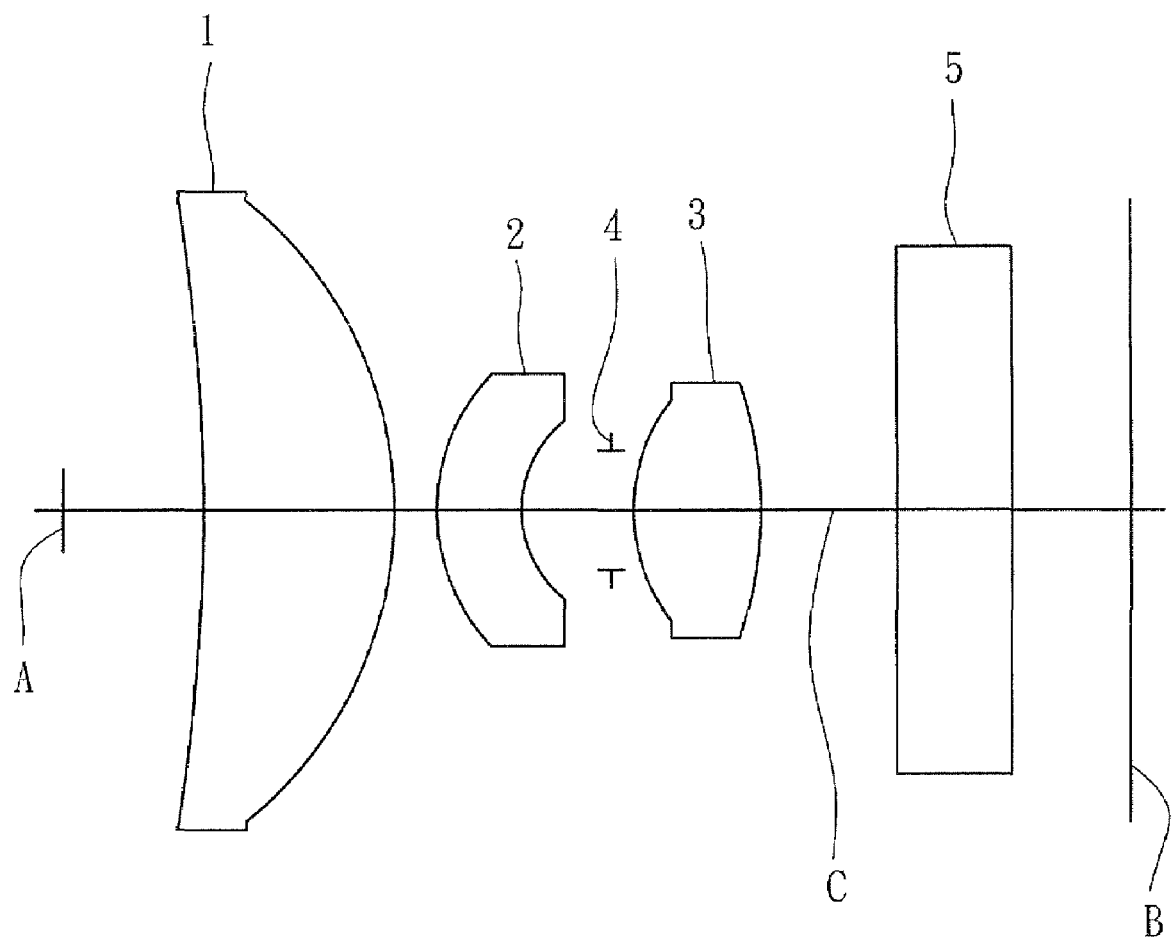
FIG. 1 is a schematic drawing showing the structure of an image-forming lens set according to a preferred embodiment of the present invention.

Referring to the annexed drawing of FIG. 1, an image-forming lens set in accordance with a preferred embodiment of the present invention is shown comprising a first lens 1, a second lens 2, a third lens 3, and an aperture stop 4.

The component parts of the image-forming lens set are arranged from the object side A toward the image side B (the image forming surface of the image sensor of charge coupled device (CCD) or complementary metal-oxide semiconductor (CMOS)) along an optical axis C in the order of the first lens 1, the second lens 2, the aperture stop 4 and the third lens 3. The first lens 1, which is a convex-concave lens with positive power, has two opposite surfaces, at least one of which is non-spherical. The surface of the first lens 1 that faces the object side A is a concave surface. The surface of the first lens 1 that faces the image side B is a convex surface. The second lens 2, which is a convex-concave lens with negative power, has two non-spherical opposite surfaces. The surface of the second lens 2 that faces the image side B is a concave surface. The aperture stop 4 is spaced between the second lens 2 and the third lens 3. The third lens 3, which is a biconvex lens with positive power, has two non-spherical opposite surfaces. That is, the surfaces of the third lens 3 that face respectively the object side A and the object side A are convex surfaces.

The aforesaid image-forming lens set satisfies the following equations.

$$D1/D2 > 2.3 \qquad \text{[Equation 1]}$$

in which:
D1 is the diameter of the first lens 1; and
D2 is the diameter of the second lens 2.

$$0 < D3/D4 < 0.1 \qquad \text{[Equation 2]}$$

in which:
D3 is the distance between the point of the optical axis C at the surface of the first lens 1 that faces the image side B and the point of the optical axis C at the surface of the second lens 2 that faces the object side A; and
D4 is the distance between the point of the optical axis C at the surface of the second lens 2 that faces the image side B and the point of the optical axis C at the surface of the third lens 3 that faces the object side A.

$$|F2/F1| < |F3| < F \qquad \text{[Equation 3]}$$

in which:
F1 is the effective focal length of the first lens 1;
F2 is the effective focal length of the second lens 2;
F3 is the effective focal length of the third lens 3; and
F is the effective focal length of the image-forming lens set.

$$V1 > 50 \qquad \text{[Equation 4]}$$

in which V1 is the dispersion coefficient of the first lens 1.

$$V2 > 50 \qquad \text{[Equation 5]}$$

in which V2 is the dispersion coefficient of the second lens 2.

$$V3 > 50 \qquad \text{[Equation 6]}$$

in which V3 is the dispersion coefficient of the third lens 3.

By means of the non-spherical first lens 1, second lens 2 and third lens 3 to constitute an image-forming lens set, the invention has a simple structure and provides an optical aberration correcting effect.

In practice, the first lens 1, the second lens 2 and the third lens 3 can be respectively coated with a layer of anti-reflective film to enhance light transmission, thereby obtaining an optimal image quality.

Further, a planar fourth lens 5 of glass may be set between the third lens 3 and the image side B to greatly improve the modulation transfer function (MTF) of the image forming lens set, thereby minimizing spherical aberration, distortion aberration, curvature of field and coma aberration. Further, the surface of the fourth lens 5 is coated with a layer of optical film (filter) that interferes with or absorbs wavelength that is not sensitive to human eyes so as to reduce scattered signal during image forming, thereby obtaining a better image quality.

Further, the first lens 1, the second lens 2, or the third lens 3 may be coated with a layer of optical film for filtering light, to reduce scattered signal during image forming, thereby obtaining a better image quality. When one of the first, second and third lenses 1-3 is coated with a layer of filter, the aforesaid fourth lens 5 can be eliminated to simplify the structure.

Further, a protective glass may be set between the third lens 3 and the image side B, or the fourth lens 5 may be used for direct protection against external particles, thereby obtaining a better image quality.

Further, the diameter of the first lens 1 is greater than the second lens 2, the third lens 3 and the fourth lens 5. When viewed from the outside, the first lens 1 is seen while the other lenses 2, 3, and 5 are not visible, and therefore the image-forming lens set provides a big diameter visual effect with less material cost, i.e., the invention saves much the material cost while meeting the requirement of an electronic device for a big size lens.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image-forming lens set comprising a first lens with positive power, a second lens with negative power, an aperture stop, and a third lens with positive power, which are arranged along an optical axis from an object side toward an image side in order;

wherein the first lens has two opposite surfaces including a concave surface facing the object side and a convex surface facing the image side, and at least one of the two opposite surfaces is a non-spherical surface;

wherein the second lens is a convex-concave lens having two non-spherical opposite surfaces including a concave surface facing the image side;

wherein the third lens has two non-spherical opposite convex surfaces facing the object side and image side respectively;

wherein at least one of the first, second and third lenses is coated with a layer of optical film for filtering light;

wherein Equation 1 is satisfied as follows:

$$D1/D2 > 2.3 \qquad \text{[Equation 1]}$$

in which:

D1 is the diameter of the first lens; and
    D2 is the diameter of the second lens;

wherein Equation 3 is satisfied as follows:

$$|F2/F1| < |F3| < F \qquad \text{[Equation 3]}$$

in which:

F1 is the effective focal length of the first lens;
    F2 is the effective focal length of the second lens;
    F3 is the effective focal length of the third lens; and
    F is the effective focal length of the whole image-forming lens set; and Equation 5 is satisfied as follows:

$$V2 > 50 \qquad \text{[Equation 5]}$$

in which V2 is the dispersion coefficient of the second lens.

2. The image-forming lens set as claimed in claim 1, which satisfies the Equation 2 as follows:

$$0 < D3/D4 < 0.1 \qquad \text{[Equation 2]}$$

in which:

D3 is the distance between the point of the optical axis at the surface of the first lens that faces the image side and the point of the optical axis at the surface of the second lens that faces the object side; and D4 is the distance between the point of the optical axis at the surface of the second lens that faces the image side and the point of the optical axis at the surface of the third lens that faces the object side.

3. The image-forming lens set as claimed in claim 1, which satisfies the Equation 4 as follows:

$$V1 > 50 \qquad \text{[Equation 4]}$$

in which V1 is the dispersion coefficient of the first lens.

4. The image-forming lens set as claimed in claim 1, which satisfies the Equation 6 as follows:

$$V3 > 50 \qquad \text{[Equation 6]}$$

in which V3 is the dispersion coefficient of the third lens.

5. The image-forming lens set as claimed in claim 1, wherein one of the first, second and third lenses is coated with a layer of optical film for enhancing light transmission.

6. The image-forming lens set as claimed in claim 1, further comprising a protective glass located between the third lens and the image side.

* * * * *